(12) United States Patent
Liebman et al.

(10) Patent No.: US 7,705,290 B2
(45) Date of Patent: Apr. 27, 2010

(54) MULTI-CHANNEL FIBER RELAYS FOR HIGH ENERGY LASER DELIVERY TO MULTI-BEAM OPTICAL SENSORS

(75) Inventors: Lionel D. Liebman, Plano, TX (US); Don A. Larson, Kennedale, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 700 days.

(21) Appl. No.: 11/069,486

(22) Filed: Mar. 1, 2005

(65) Prior Publication Data

US 2006/0197013 A1    Sep. 7, 2006

(51) Int. Cl.
| H01J 3/14 | (2006.01) |
| G01J 1/04 | (2006.01) |
| G02F 1/295 | (2006.01) |
| G02B 6/00 | (2006.01) |
| G01C 3/08 | (2006.01) |

(52) U.S. Cl. .................. 250/234; 259/227.14; 385/9; 385/12; 356/4.01

(58) Field of Classification Search .............. 250/203.6, 250/216, 234, 227.14, 227.28, 227.16–227.19, 250/227.24; 356/5.01–5.08, 139.05–139.08, 356/3.16, 138, 141.1–141.4, 4.01; 244/3.11; 342/62; 385/15–18, 24, 33, 115, 116, 119, 385/12, 32, 36, 50, 9, 39, 40
See application file for complete search history.

(56) References Cited

U.S. PATENT DOCUMENTS 5,200,606 A * 4/1993 Krasutsky et al. .......... 250/216

| 6,288,381 B1 * | 9/2001 | Messina ............. 250/201.1 |
| 6,751,369 B1 * | 6/2004 | Lewis ............... 385/18 |
| 6,865,309 B2 * | 3/2005 | Dho ................. 385/15 |
| 2003/0103718 A1 * | 6/2003 | Chen ................ 385/22 |
| 2005/0201429 A1 * | 9/2005 | Rice et al. ........... 372/27 |

FOREIGN PATENT DOCUMENTS

| EP | 0402564 | 12/1990 |
| GB | 2300325 | 10/1996 |
| WO | 93/01465 | 1/1993 |

OTHER PUBLICATIONS

European Search Report Dated Jul. 3, 2006 for Serial No. PCT/US06/003605.

* cited by examiner

*Primary Examiner*—Georgia Y Epps
*Assistant Examiner*—Don Williams
(74) *Attorney, Agent, or Firm*—Williams, Morgan & Amerson P.C.

(57) ABSTRACT

A multi-beam LADAR apparatus and a method for use in a multi-beam LADAR system are disclosed. The apparatus includes a plurality of mission specific optics; a gimbal in which the mission specific optics are mounted; an off-gimbal laser; and a multi-fiber relay optically linking the laser output to the mission specific optics. The method includes gimbaling a plurality of mission specific optics; generating a laser signal off the gimbal; and optically relaying the laser signal to the mission specific optics through a plurality of discreet channels.

23 Claims, 3 Drawing Sheets

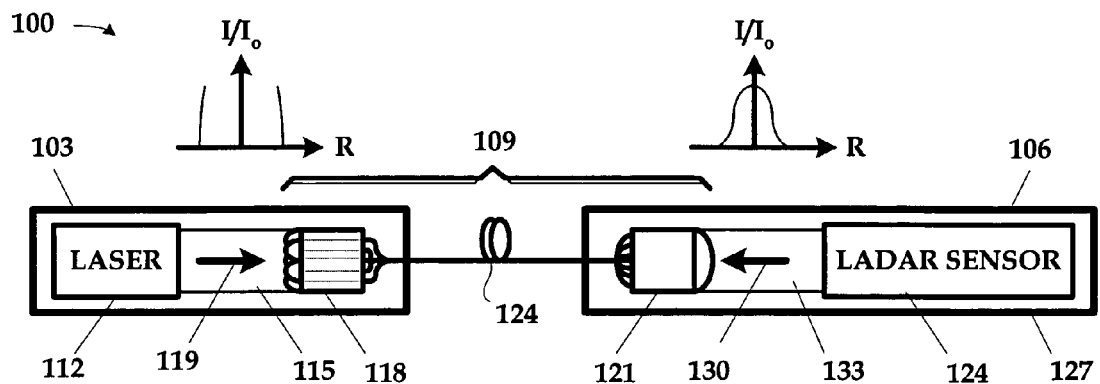
FIG. 1
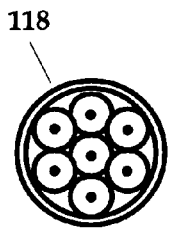 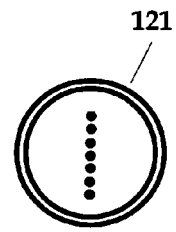
FIG. 2A  FIG. 2B
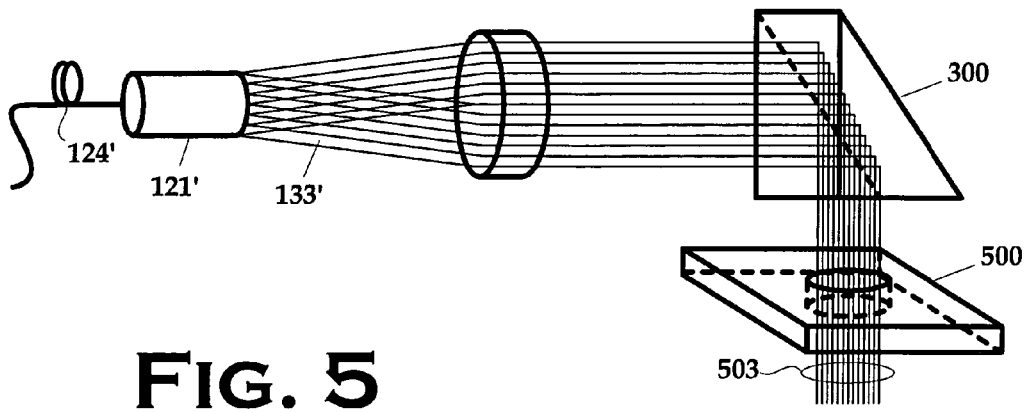
FIG. 5

MULTI-CHANNEL FIBER RELAYS FOR HIGH ENERGY LASER DELIVERY TO MULTI-BEAM OPTICAL SENSORS

BACKGROUND OF THE INVENTION

1. Field of the Invention

The present invention pertains to LADAR systems, and, more particularly, to a LADAR transmitter for use in a scanned illumination implementation.

2. Description of the Related Art

Many military and civilian remote sensing applications rely on optical techniques such as laser detection and ranging ("LADAR"). At a very high level, LADAR works much like the more familiar RADAR ("radio wave detection and ranging"), in which radio waves are transmitted into the environment and reflected back, the reflections yielding range and position information for the objects that generate them. LADAR does roughly the same thing, but using light rather than radio waves. Although there are some significant differences in performance, they are similar in at least this one basic respect.

One type of LADAR system employs what is known as a "scanned illumination" technique for acquiring data. More technically, a LADAR transceiver aboard a platform transmits the laser signal to scan a geographical area called a "scan pattern". The laser signal is typically a pulsed, split-beam laser signal. That is, the laser signal is typically transmitted in short bursts rather than continuously. The LADAR transceiver produces a pulsed (i.e., non-continuous) single beam that is then split into several beamlets spaced apart from one another by a predetermined amount. Each pulse of the single beam is split, and so the laser signal transmitted in is actually, in the illustrated embodiment, a series of grouped beamlets. The LADAR transceiver aboard the platform transmits the laser signal. The laser signal is continuously reflected back to the platform, which receives the reflected laser signal. Note, however, that some implementations employ a continuous beam, an unsplit beam, or a continuous, unsplit beam.

Each scan pattern is generated by scanning elevationally, or vertically, several times while scanning azimuthally, or horizontally, once within the field of view for the platform. Thus, each scan pattern is defined by a plurality of elevational and azimuthal scans. The principal difference between the successive scan patterns is the location of the platform at the start of the scanning process. An overlap between the scan patterns is determined by the velocity of the platform. The velocity, depression angle of the sensor with respect to the horizon, and total azimuth scan angle of the LADAR platform determine the scan pattern on the ground. Note that, if the platform is relatively stationary, the overlap may be complete, or nearly complete.

The platform typically maintains a steady heading while the laser signal is transmitted at varying angles relative to the platform's heading to achieve the scans. The optics package of the LADAR transceiver that generates and receives the laser signal is typically "gimbaled", or mounted in structure that rotates relative to the rest of the platform. Exemplary gimbaled LADAR transceivers are disclosed in:

- U.S. Pat. No. 5,200,606, entitled "Laser Radar Scanning System," issued Apr. 6, 1993, to LTV Missiles and Electronics Group as assignee of the inventors Nicholas J. Krasutsky, et al.; and
- U.S. Pat. No 5,224,109, entitled "Laser Radar Transceiver," issued Jun. 29, 1993, to LTV Missiles and Electronics Group as assignee of the inventors Nicholas J. Krasutsky, et al.

However, there are many alternatives known to the art.

For technical reasons, the entire optics package is typically gimbaled. More particularly, in conventional systems, the components that comprise the optical train through which the laser signal is generated and transmitted must be optically aligned. This optical alignment cannot be achieved when a part of the optical train is moving relative to the rest of the optical train. Thus, the LADAR transceiver has "on-gimbal" laser cavities and bulk optics to expand, collimate, segment, and align the laser output. This adds size, weight, complexity, and cost to the LADAR transceiver. The on-gimbal laser cavity also requires a fiber coupled Laser diode pump which is a significant cost driver. Furthermore, current delivery and alignment techniques for the bulk optics are inefficient, sensitive to tolerances and temperature, and limit the output power per channel and therefore limits the signal-to-noise ratio in a multi-beam LADAR system.

The art has not found a successful solution to these types of problems associated with conventional gimbaled LADAR transmitters/transceivers. One approach employs a fiber laser to mitigate some of these problems. However, current fiber lasers and mode coupled fiber delivery approaches are limited either in their power tolerance (i.e., laser induced 5 damage threshold, or "LIDT") or laser beam quality (e.g., times diffraction limit, or $M^2$) because they tend to rely on a single fiber optic channel. For example, a conventional single mode optical fiber has a very small mode field diameter, and therefore, higher energy densities at its fiber/air interface and lower LIDT. Increasing the mode field diameter without limiting the number of guided modes may improve LIDT, but it increases output $M^2$ reducing delivered beam quality.

The present invention is directed to resolving, or at least reducing, one or all of the problems mentioned above.

SUMMARY OF THE INVENTION

The invention includes a multi-beam LADAR apparatus and a method for use in a multi-beam LADAR system. The apparatus comprises a plurality of mission specific optics; a gimbal in which the mission specific optics are mounted; an off-gimbal laser; and a multi-fiber relay optically linking the laser output to the mission specific optics. The method comprises gimbaling a plurality of mission specific optics; generating a laser signal off the gimbal; and optically relaying the laser signal to the mission specific optics through a plurality of discreet channels.

BRIEF DESCRIPTION OF THE DRAWINGS

The invention may be understood by reference to the following description taken in conjunction with the accompanying drawings, in which like reference numerals identify like elements, and in which:

FIG. 1 is a block diagram of a LADAR transmitter constructed and operated in accordance with the present invention;

FIG. 2A-FIG. 2B illustrate the small beam collimators and the large beam collimator of the LADAR transmitter of FIG. 1 in plan, end views;

FIG. 5 illustrates the near-field beam spatial overlap of the LADAR transmitter of FIG. 3.

Figure 3:
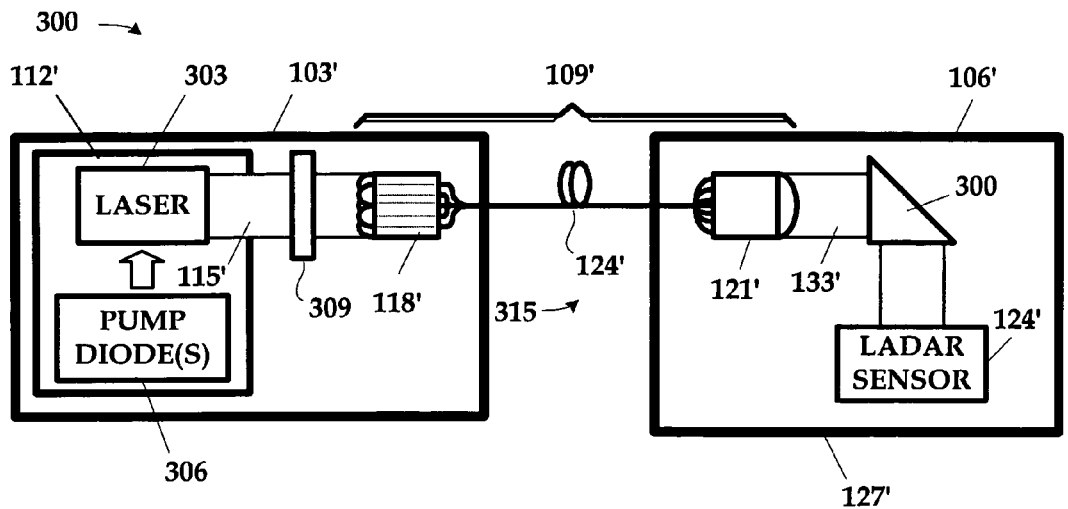
FIG. 3 is a block diagram of one particular embodiment of the LADAR transmitter of FIG. 1.

While the invention is susceptible to various modifications and alternative forms, the drawings illustrate specific embodiments herein described in detail by way of example. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

FIG. 1 illustrates one particular embodiment of an LADAR transmitter 100 for use in a multi-beam LADAR system built and operated in accordance with the present invention. The LADAR transmitter 100 comprises an off-gimbal subassembly 103, an on-gimbal assembly 106, and a multi-channel fiber relay 109 between them. The off-gimbal subassembly 103 includes a laser 112, capable of producing a laser signal 115, and a plurality of small beam collimators 118. In the illustrated embodiment, the small beam collimators 118 are arrayed as is shown best in FIG. 2A, which is a view in the direction of the arrow 119. The on-gimbal subassembly 106 includes a large beam collimator 121 and a LADAR sensor 124 mounted on a gimbal 127. The multi-channel fiber relay 109 is comprised of, in the illustrated embodiment, the small beam collimators 118, the large beam collimator 121, and a plurality of optical fibers 124, each optical fiber 124 defining a channel. The number of optical fibers 124 in the multi-channel fiber relay 109 is not material to the practice of the invention.

The small beam collimators 118 and the large beam collimator 121 are, in the illustrated embodiment, Silicon Dioxide ($SiO_2$) laser fused collimators. Suitable small beam collimators and large beam collimators are commercially available off the shelf and are photonics market commodities. The small beam collimators 118 provide a uniform energy distribution from the laser signal 115 across the optical fibers of the multi-channel fiber relay 109. As is best shown in FIG. 2A, the small beam collimators 118 area arrayed in a hex-close pack with a ~75% fill factor. The multi-channel fiber relay 109 relays the laser signal 115 through the multiple discreet channels defined by the optical fibers to the large beam collimator 121. The multi-channel fiber relay 109 terminates in the single, large beam collimator 121 with, in the illustrated embodiment, a telecentric input to the large beam collimator 121. The output 133 of the large beam collimator 121 is a plurality of laser signals, e.g., beamlets, that comprise a split beam laser signal. The total relay insertion loss of the illustrated embodiment is <1.5 dB.

The laser 112 may be implemented using any suitable laser known to the art. Suitable lasers 112 may include, for instance, a side-pumped laser, a diode-pump solid state Q-switched laser, and a side-pumped diode-pump solid state laser cavity. Note that, because it removes the laser 112 from the gimbal 127, the present invention affords an extra degree of flexibility in implementing the laser 112 relative to the state of the art. Thus, some types and/or models of lasers ordinarily unsuitable for conventional LADAR systems may be suitable for use with the present invention. Exemplary of such lasers are pulsed fiber lasers and fiber coupled solid state lasers with passive or external Q-switch, and/or fiber optic amplifiers.

For instance, the current expensive end-pumped cavity laser used in conventainal LADAR systems may be replaced with a more cost effective side-pumped laser, where the crystal/gain medium may be pumped directly with laser diodes. Fiber lasers and/or fiber optic amplifiers also become a practical and cost effective replacement, wherein the fiber is pumped and itself is the gain medium and cavity). Side-pumped laser outputs may also be "fiber coupled". That is, the laser's output may be launched into the input of a fiber optic cable via a large beam fused collimators and terminated with another fused collimator on the output (as a means of delivering the laser energy from off gimbal to on-gimbal as suggested in the multi-channel fiber relay concept). Fiber lasers would only need to be terminated on the output with a fused collimator since the laser energy originates in the fiber optic waveguide.

However, "fiber coupled" side pumped lasers and fiber lasers still represent a single fiber channel with limitations in the power handling capability, non-linear effects, and spectral broadening of a single fiber—risks mitigated by a multi-channel fiber relay concept. Naturally, there will be variations on the current multi-channel fiber relay concept that may be designed to accommodate a variety of fiber or fiber coupled lasers with greater power tolerance than a single channel fiber—all while consolidating the segmentation and beam conditioning required for multi-beam Ladar as prescribed in the multi-channel baseline herein.

The LADAR sensor 124 comprises a plurality of mission specific optics. These mission specific optics may include one or more of a folding mirror, a prism, a scanner, an optical switch, and a beam expansion optical component, none of which are shown. The type of considerations that will influence the selection of mission specific optics include the design constraints like near-field beam separation, beam divergence, and far-field beam separation. For instance, some embodiments may add scanners and gimbals for accomplishing specific field of view and field of regard requirements.

To further an understanding of the present invention, one particular embodiment of the LADAR transmitter 100 of FIG. 1 will now be presented. Turning to FIG. 3, a LADAR transmitter 300 is shown. The LADAR transmitter 300 has many parts in common with the LADAR transmitter 100, with like parts bearing like numbers.

Figure 4A:
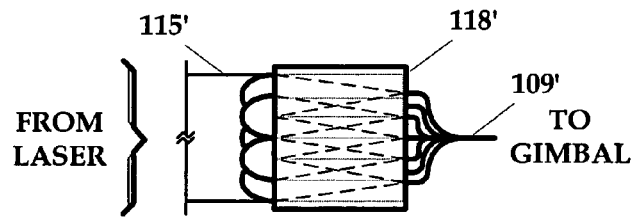
FIG. 4A-FIG. 4C provide additional detail of selected portions of the LADAR transmitter of FIG. 3.

In the off-gimbal subassembly 103', the laser 112' comprises a side-pumped, 1064 nm cavity laser 303 pumped by one or more, preferably at least two, pump diodes 306. The laser signal 115' produced by the laser 112' has a 0.9 mm beam spread. The off-gimbal subassembly 103' also includes an optional diffractive optical element ("DOE") 309 or other beam conditioning optics between the laser 112' and the small beam collimators 118'. Other optics that might be employed include, for instance, an optical attenuator that might be employed for gain control purposes. FIG. 4A conceptually illustrates how the small beam collimators 118' focus portions of the laser signal 115' onto the individual optical fibers 124' of the multi-channel fiber relay 109'.

Figure 4B:
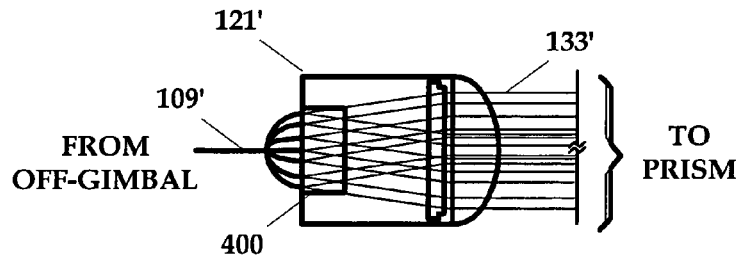

The optical fibers 124' of the multi-channel fiber relay 109' comprises seven single mode optical fibers 124', one for each of the small beam collimators 118'. Each single mode optical fiber 124' has a numerical aperture ("NA") of 0.14. The optical fibers 124' are fused to the small beam collimators 118' and the large beam collimator 121' using well known fabrication techniques. More particularly, with respect to the large beam collimator 121', the single mode optical fibers 124' are fused to a $SiO_2$ seed 400, shown in FIG. 4B, of the large beam collimator 121'. Suitable optical fibers 124', like the small beam collimators 118' and the large beam collimator 121', are commercially available off the shelf.

In the illustrated embodiment, the small beam collimators 118' and the large beam collimator 121' are fabricated to create male connector elements, or plugs. Each of the off-gimbal subassembly 103' and the on-gimbal subassembly 106' include female connector elements, or sockets, (not shown) into which the small beam collimator 118' and the large beam collimator 121' are plugged. In the illustrated embodiment, the connector of the large beam collimator 121' is keyed. The multi-channel optical fiber relay 109' in this particular embodiment therefore includes a simple keyed connector interface that provides a degree of modularity not only to the multi-channel optical fiber relay 109', but also the off-gimbal subassembly 103' and the on-gimbal subassembly 106'.

Figure 4C:
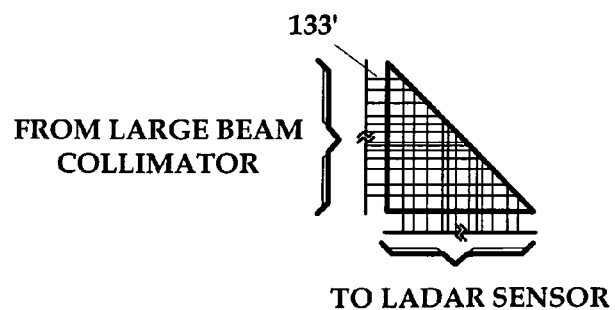

In addition to the large beam collimator 121', the on-gimbal subassembly 106' also includes a total internal reflectance ("TIR") prism 312 in addition to the LADAR sensor 124'. The laser signal 133' exiting the large beam collimator 121' comprises seven beamlets, as was discussed above. The beamlets exit the large beam collimator 121' to the prism 312, which spreads them to a total beam spread of 3.7 mm. The operation of the prism 312 is conceptually illustrated in FIG. 4C.

Figure 6:
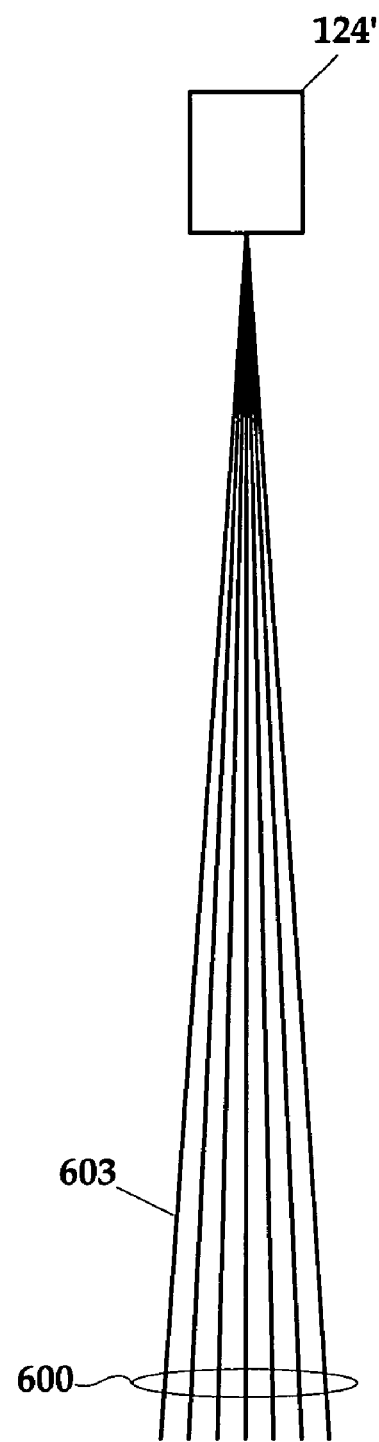
FIG. 6 illustrates the far-field beam separation of the LADAR transmitter of FIG. 3.

The on-gimbal subassembly 106', like the off-gimbal subassembly 103', may also include other beam conditioning optics. The LADAR sensor 124' will typically include such beam conditioning optics to manipulate the laser signal 133' suitable for the particular application. In one particular application, the LADAR sensor 124' includes a holed mirror 500, shown in FIG. 5, through which the LADAR sensor 133' transmits the laser signal 133' with a near-field beam spatial overlap 503 that results in a far-field beam separation 600, shown in FIG. 6, for use in a LADAR system used in remote sensing applications such as reconnaissance.

Thus, returning to FIG. 3, the LADAR system 300 includes an off-gimbal laser 112' output (i.e., the laser signal 115') coupled to a fiber bundle 315 (i.e., the optical fibers 124') via a fused collimator (i.e., the small beam collimators 121'). The fiber bundle 315 relays the laser signal 115' to the gimbal 127' in discreet channels. The fiber bundle 315 terminates in a linear array fused to the large beam collimator 118'. The large beam collimator 118' is selected for the required output beam size and divergence. Fiber spacing and lens focal length are selected for the desired angular spacing. The fused, large beam collimator 121' is attached via a keyed connector aligned to the holed mirror. Segmented beamlets 603, shown in FIG. 6 (only one indicated), are transmitted through the holed mirror 500 as spatially overlapping but angularly separated beams as in conventional architectures.

Thus, in its various aspects and embodiments, the invention provides one or more of the following:

- a common seeker interface for the LADAR sensor.
- channel equalization and elimination of loss due to diffraction efficiency of binary diffraction gratings (segmenters) in conventional multi-beam LADAR systems.
- an off-gimbal laser delivery solution that reduces cost and complexity to the transmit optical path while increasing output power per channel and improving reliability over current systems. A fiber coupled relay facilitates the use of end-pumped laser cavities or diode arrays off-gimbal as lower cost alternatives. Also, laser generated heat becomes easier to manage, and space becomes available on-gimbal for multi-mode seeker concepts.
- improved system signal-to-noise ratio. Multi-channel fiber relays require fewer components and provide more efficient delivery. The invention increases laser power per channel without risking optical damage to the fiber or inducing other non-linear optical effects. The net result is a lower loss transmit path with higher power handling capability for much greater power per channel in a multi-beam LADAR.
- reduced system size and cost. Complex on-gimbal laser and transmit path optics alignment may be replaced with a single line replaceable unit ("LRU") with simple keyed connector attachments.
- enhanced reliability. The simplified approach has smaller part count, shorter optical path, and fewer critical surfaces. The resulting assembly is less susceptible to contamination and therefore has fewer opportunities for defects in environments.
- a reusable modularity/Sensor. A relay provides interface and reformatting necessary to integrate a common LADAR sensor on multiple platforms, multi-mode seekers, and Laser solutions.
- upward compatibility: A multi-channel fiber relay concept also facilitates adding COTS fiber optics, signal conditioning, and multiplexing products into future LADAR architectures.

As implied above, not every embodiment or aspect of the invention will necessarily manifest all these advantages. Also, further advantages may become apparent to those skilled in the art having the benefit of this disclosure.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A multi-beam optical apparatus, comprising:
   a plurality of mission specific optics;
   a gimbal in which the mission specific optics are mounted;
   an off-gimbal laser; and
   a multi-fiber relay optically linking the laser output of the off-gimbal laser to the mission specific optics including a plurality of optical fibers; a plurality of small beam collimators, each fused to a respective one of the optical fibers at a first end thereof; and a large beam collimator fused to each of the optical fibers at a second end thereof.

2. The multi-beam optical apparatus of claim 1, wherein the mission specific optics include at least one of a folding mirror, a prism, a scanner, a gimbal, an optical switch, and a beam expansion optical component.

3. The multi-beam optical apparatus of claim 1, wherein the off-gimbal laser comprises one of a side-pumped laser, a diode-pump solid state Q-switched laser, pulsed fiber lasers, a fiber coupled solid state laser, and a side-pumped diode-pump solid state laser cavity.

4. The multi-beam optical apparatus of claim 1, wherein at least one of the small beam collimators and the large beam collimator includes a laser fused collimator.

5. The multi-beam optical apparatus of claim 1, further comprising an off-gimbal diffractive optical element.

6. The multi-beam optical apparatus of claim 1, wherein the multi-fiber relay includes at least one keyed connector.

7. The multi-beam optical apparatus of claim 1, wherein the laser comprises a portion of an off-gimbal subassembly.

8. The multi-beam optical apparatus of claim 1, wherein the mission specific optics comprise a portion of an on-gimbal subassembly.

9. The multi-beam optical apparatus of claim 1, wherein the multi-fiber relay segments, collimates, or segments and collimates the laser output.

10. The multi-beam optical apparatus of claim 1, wherein the multi-fiber relay reformats the laser output.

11. A multi-beam optical apparatus, comprising:
   a plurality of mission specific optics;
   means for gimbaling the mission specific optics are mounted;
   means for generating a laser signal located off the gimbaling means; and
   means for relaying the laser signal from the laser signal generating means to the mission specific optics including a plurality of small beam collimators, each fused to a respective one of the optical fibers at a first end thereof; and a large beam collimator fused to each of the optical fibers at a second end thereof.

12. The multi-beam optical apparatus of claim 11, wherein the mission specific optics include at least one of a folding mirror, a prism, a scanner, an optical switch, a gimbal, and a beam expansion optical component.

13. The multi-beam optical apparatus of claim 11, wherein the laser generating means comprises one of a side-pumped laser, a diode-pump solid state Q-switched laser, pulsed fiber lasers, a fiber coupled solid state laser, and a side-pumped diode-pump solid state laser cavity.

14. The multi-beam optical apparatus of claim 11, wherein at least one of the small beam collimators and the large beam collimator includes a laser fused collimator.

15. The multi-beam optical apparatus of claim 11, further comprising an off-gimbal diffractive optical element.

16. The multi-beam optical apparatus of claim 11, wherein the relaying means comprises:
   means for optically guiding the laser signal;
   means for splitting and collimating the laser signal at a first point on the optically guiding means; and
   means for collimating the split and collimated laser signal at a second point on the optically guiding means.

17. The multi-beam optical apparatus of claim 11, wherein the relaying means includes at least one keyed connector.

18. The multi-beam optical apparatus of claim 11, wherein the relaying means also segments, collimates, or segments and collimates the laser signal.

19. The multi-beam optical apparatus of claim 11, wherein the relaying means also reformats the laser signal.

20. A method for use in a multi-beam optical system, comprising:
   gimbaling a plurality of mission specific optics;
   generating a laser signal off the gimbal; and
   optically relaying the laser signal to the mission specific optics through a plurality of discreet channels wherein each discreet channel comprises a plurality of small beam collimators, each fused to a respective one of the optical fibers at a first end thereof; and a large beam collimator fused to each of the optical fibers at a second end thereof.

21. The method of claim 20, wherein optically relaying the laser signal includes optically relaying the signal through a multi-fiber relay comprising:
   a plurality of optical fibers;
   a plurality of small beam collimators, each fused to a respective one of the optical fibers at a first end thereof; and
   a large beam collimator fused to each of the optical fibers at a second end thereof.

22. The method of claim 20, wherein optically relaying the laser signal includes segmenting, collimating, or segmenting and collimating the laser signal.

23. The method of claim 20, wherein optically relaying the laser signal includes reformatting the laser signal.

* * * * *